March 25, 1930.　　　　A. D. WOOD　　　　1,751,966
EXTENSION SEAT
Filed Dec. 13, 1928
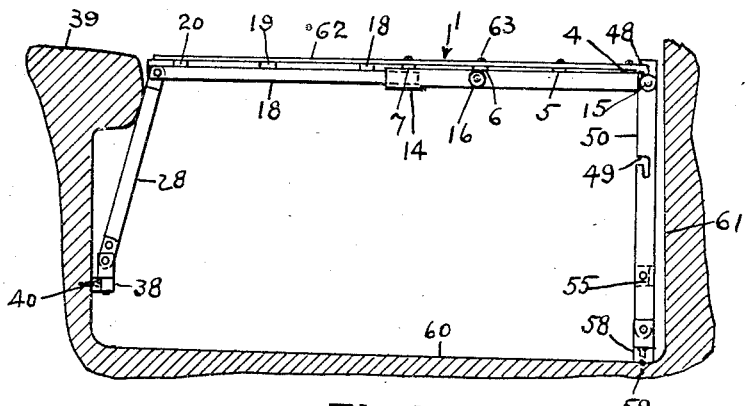
Fig.1.
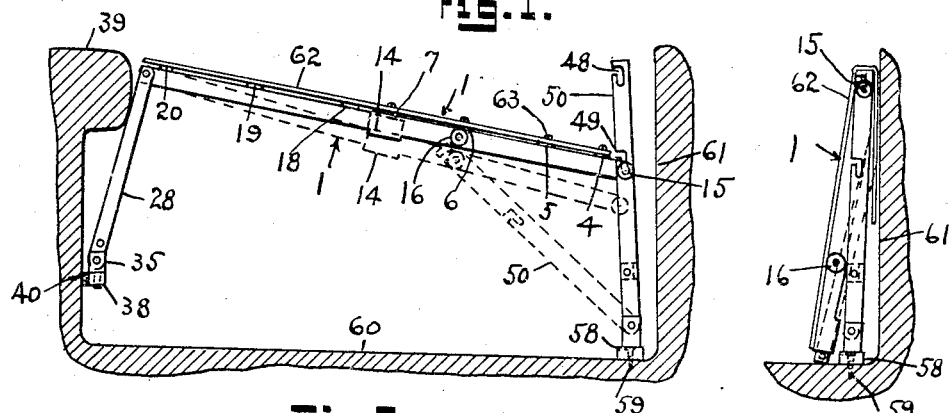
Fig.2.　　　　Fig.3.
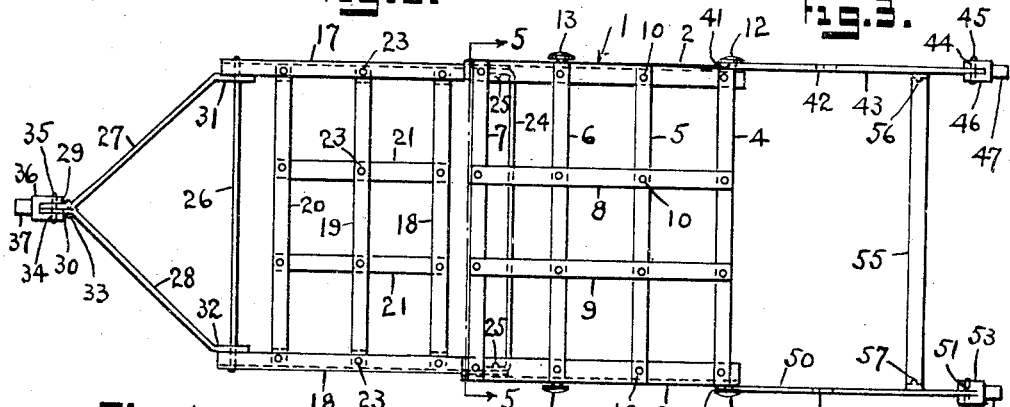
Fig.4.
Fig.5.
Avis Dickson Wood
INVENTOR
BY Charles A. Clark.
ATTORNEY Patented Mar. 25, 1930

1,751,966

UNITED STATES PATENT OFFICE

AVIS DICKSON WOOD, OF LAKEWOOD, NEW JERSEY

EXTENSION SEAT

Application filed December 13, 1928. Serial No. 325,768.

My invention relates to automobiles and refers more particularly to an extension seat which may be utilized with the rear seat of an automobile.

One object of my invention is to provide an extension seat for the rear seat of an automobile that can be utilized as an additional seat.

Another object of my invention is to provide an extension seat for the rear seat of an automobile that is adapted to be utilized as a leg rest.

Still another object of my invention is to provide an extension for the rear seat of an automobile that is adjustable to various positions.

A still further object of my invention is to provide a detachable extension for the rear seat of an automobile that is adapted to be folded against the back of the front seat when not in use or it may be detached and removed therefrom.

I accomplish these results by the means illustrated in the accompanying drawings, wherein similar numerals refer to like parts throughout the several views, in which:—

Figure 1, is a partial section of an automobile with the device positioned to use as a seat or leg rest.

Figure 2, is a partial section of an automobile with the device shown in two inclined positions, one in full lines and the other in dotted lines.

Figure 3, is a partial section of an automobile illustrating how the device is folded up against the back of the front seat.

Figure 4, is a plan of the device in an extended position.

Figure 5, is a cross section, taken on lines 5—5 of Figure 4.

The device 1 consists of a frame work comprised of the angles 2 and 3, held in spaced relation to each other by the cross pieces 4, 5, 6 and 7 and the pieces 8 and 9, said pieces held to each other by the rivets 10.

The angle 2 is provided with a U shaped extension 11 and carries a button 12 on one end and a button 13 a suitable distance from the other end, these buttons being fixed on the depending leg of said angle.

The angle 3 is provided with a U shaped extension 14 and carries a button 15 on one end directly opposite the button 12 and a button 16 directly opposite the button 13.

There is a second frame provided which is comprised of an angle 17 and an angle 18 which are held in spaced relation to each other by the cross pieces 18, 19 and 20, said pieces held to each other by the tie pieces 21 and 22, all of which are held together by the rivets 23.

On one end of these angles 17 and 18 is fixed a piece 24 by means of the rivets 25 and on the other end a rod 26 is fixed.

This rod 26 carries a Y shaped piece made up of two parts 27 and 28 which are formed at 29 and 30, parallel to the ends 31 and 32, pivoted on the rod 26 and these ends 29 and 30, held together by the rivet 33 are provided with a hole 34 to engage with a pivot 35 which engages with a clevis 36 having a shouldered end 37 which is adapted to detachably engage with the support 38, held under the back seat 39 in any suitable position by the screws 40.

This angle piece 17 is slidable in the U shaped part 11 in the angle 2 and the angle 18 slidable in the U shaped part 14 in angle 3, so that these two frames may slide within each other, as shown in Figure 3.

The buttons 12 and 13 are formed to engage in either of the bayonet slots 41 and 42 on piece 43 and one end of this piece is provided with a hole 44 adapted to hold a pivot 45 in the clevis 46 that is provided with a shouldered part 47.

The buttons 15 and 16 are formed to engage in either of the bayonet slots 48 and 49 in the piece 50, the end of which has a hole 51 adapted to hold a pivot 52 in the clevis 53 provided with a shouldered part 54.

Both of these parts 43 and 50 are held in spaced relation to each other by the bar 55 and rivets 56 and 57 and each of the shouldered parts 47 and 54 are detachably held in the support 58, one of which is shown in Figures 1, 2 and 3, by means of the screws 59, said supports fixed to the floor 60 near the back 61, of the front seat.

On the top of these two sliding elements, a cushion or carpet 62 may be held by the screws 63.

In operation, this extension seat is normally positioned as shown in Figure 3 and may be either placed in the position shown in Figure 1, the position shown in Figure 2 by the solid lines or in the position shown in Figure 2 by the dotted lines.

Having thus described and illustrated the preferred embodiment of my invention I do not wish to limit myself to the exact construction or arrangement of parts shown, since it is evident that modifications may be made therein without departing from the spirit of the invention or scope of the claims.

I claim:—

1. In combination with a vehicle body, an extension seat comprised of inner and outer sliding frames, the inner one pivotally connected to a Y shaped element adapted to engage with and be held by a support fixed under the rear seat of said vehicle and the outer frame pivoted to a frame adapted to engage with a support fixed adjacent the back of the front seat of said vehicle.

2. In combination with a vehicle body, an extension seat comprised of inner and outer sliding frames, the inner one pivotally connected to a Y shaped element adapted to detachably engage with and be held by a support fixed under the rear seat of said vehicle and the outer frame pivotally engaging a frame adapted to deteachably engage with a pivoted support fixed adjacent to the back of the front seat of said vehicle.

Dated at New York in the county of New York and State of New York, this 24th day of November, 1928.

AVIS DICKSON WOOD.